US009066115B1

(12) United States Patent
Cherry et al.

(10) Patent No.: US 9,066,115 B1
(45) Date of Patent: Jun. 23, 2015

(54) STRUCTURING DYNAMIC ADVERTISEMENT BREAKS IN VIDEO MANIFEST FILES

(75) Inventors: Guy W. Cherry, Beaverton, OR (US); Stephen J. Kraiman, Doylestown, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 13/558,650

(22) Filed: Jul. 26, 2012

Related U.S. Application Data

(60) Provisional application No. 61/513,068, filed on Jul. 29, 2011.

(51) Int. Cl.
*H04N 7/10* (2006.01)
*H04N 21/234* (2011.01)
*H04N 21/2668* (2011.01)

(52) U.S. Cl.
CPC ..... *H04N 21/23424* (2013.01); *H04N 21/2668* (2013.01)

(58) Field of Classification Search
CPC .............. H04N 21/23424; H04N 21/2668
USPC ...................................... 725/34, 35
See application file for complete search history.

(56) References Cited

U.S. PATENT DOCUMENTS

| 2006/0271440 | A1* | 11/2006 | Spinucci et al. | 705/14 |
| 2011/0078002 | A1* | 3/2011 | Leary et al. | 705/14.4 |
| 2011/0145858 | A1* | 6/2011 | Philpott et al. | 725/32 |
| 2012/0197419 | A1* | 8/2012 | Dhruv et al. | 700/94 |
| 2012/0198492 | A1* | 8/2012 | Dhruv et al. | 725/32 |

* cited by examiner

*Primary Examiner* — Pankaj Kumar
*Assistant Examiner* — Franklin Andramuno
(74) *Attorney, Agent, or Firm* — Bart A. Perkins (57) ABSTRACT

Methods, systems, and computer readable media can provide for structuring of dynamic advertisement breaks in video manifest files. This can be facilitated by accessing information associated with a recognized advertisement break in a video stream and inserting information into a generic manifest file to create a customized manifest file in order to drive downstream server or equipment decisions.

21 Claims, 7 Drawing Sheets

```
GET ad?net=ABC&time=2011-06-15T23:43:09.279Z&eid=0615121345 HTTP/1.1
```

```
HTTP/1.1 200 OK
Content-Length: 297
Content-Type: application/xml

#EXTINF:12
http://adserver7/ads/BMSSelectedAd_01.ts?net=ABC&seg=1&eid=0615121345
#EXTINF:12
http://adserver7/ads/BMSSelectedAd_01.ts?net=ABC&seg=2&eid=0615121345
#EXTINF:3
http://adserver7/ads/BMSSelectedAd_01.ts?net=ABC&seg=3&eid=0615121345
```

```
HTTP OK
Content-Length: 297
Content-Type: application/xml

#EXTINF:12
http://adserver7/ads/<FEED_01>?net=ABC&seg=1&eid=0615121345
#EXTINF:12
http://adserver7/ads/<FEED_02>?net=ABC&seg=2&eid=0615121345
#EXTINF:3
http://adserver7/ads/<FEED_03>?net=ABC&seg=3&eid=0615121345
```

FIG. 4D ↙ 431

```
#EXTINF:12
http://cdnservers/Movie99_05.ts
#EXTINF:9
http://cdnservers/Movie99_05.ts
#EXTINF:12
http://adserver7/ads/Movie_99_06.ts?net=ABC&seg=1&eid=0615121345
#EXTINF:12
http://adserver7/ads/Movie_99_07.ts?net=ABC&seg=2&eid=0615121345
#EXTINF:3
http://adserver7/ads/Movie_99_08.ts?net=ABC&seg=3&eid=0615121345
#EXTINF:12
http://cdnservers/Movie99_09.ts
#EXTINF:12
http://cdnservers/Movie99_10.ts
```
↙ 442

STRUCTURING DYNAMIC ADVERTISEMENT BREAKS IN VIDEO MANIFEST FILES

CROSS REFERENCE TO RELATED APPLICATION

This application claims the benefit as a non-provisional application of U.S. Provisional Application Ser. No. 61/513,068, entitled "Providing Dynamic Ad Breaks in Video Manifest Files," which was filed on Jul. 29, 2011, and is incorporated herein by reference in its entirety.

TECHNICAL FIELD

This disclosure relates to the structuring of dynamic advertisement breaks in video manifest files.

BACKGROUND

Television viewing is moving to internet protocol (IP) video formats such as Apple HLS, Microsoft Smooth and Adobe Flash. These formats use a technique referred to as segmented HTTP transport (SHT). Using the SHT technique, a customer premise equipment (CPE) device pre-fetches video in segments, stores the segments in memory, decodes the segments and presents the video in a continuous manner. The CPE device fetches segments as needed so that the segment count does not drop below a threshold and the CPE device can continuously play the IP video stream without interruption. The CPE device typically fetches segments from a list of segments called an index file or manifest file. The index file or manifest file is typically downloaded as the CPE device starts a session and can be refreshed periodically to accommodate live streams that have no predetermined endpoint.

Another feature that has been layered on top of SHT is referred to as adaptive streaming. Rather than encoding a piece of video for a single quality or bit rate, adaptive streaming encodes a piece of video for multiple bit rates. In effect, systems using adaptive streaming produce multiple versions of the same piece of video, one for each bit rate. In this instance, the manifest file construct is extended with information that allows the CPE device to request different bitrates as it adapts to network traffic.

The CPE device typically uses a variety of algorithms to determine which bitrate to choose. In some implementations, if operating conditions such as network congestion or CPU load cause the CPE device to run out of data or drop video frames, then the device may choose a lower quality version for the next segment in the sequence. In other implementations, if the content is arriving quickly, the CPE device may request a higher quality version of the next segment in the sequence.

Another improvement added to adaptive SHT is live streaming. Because during live streaming, content is being encoded in real-time and new segments are being created, the manifest file is typically being constantly updated. Further, because content is being produced and consumed in real-time the CPE device is typically constantly requesting an updated version of the manifest file to get information on how to request the newly added segments of video.

BRIEF DESCRIPTION OF THE DRAWINGS

Like reference numbers and designations in the various drawings indicate like elements.

DETAILED DESCRIPTION

In some implementations of this disclosure, systems and methods can operate to structure advertisement breaks in video manifest files. Advertising can be incorporated into the presentation of an IP video stream by adding segment references instructing the manifest file to pull segments from an advertisement server. In some implementations, fetch and delivery logic can play cleanly across advertisement boundaries without the use of video splicers. Because SHT supports unicast streams, fetched and presented by a single client, some implementations of this disclosure can facilitate targeting advertisements to individual clients.

In current implementations, advertising is inserted into the video stream before it is encoded. Delivering a customized version of live or stored video content typically requires multiple versions of the same content to be created, one for each variation. Such an implementation typically involves individually encoding and storing each version of the content. For example, in regions with various advertisement zones, unique instances of the same program are encoded and stored for each of the various advertisement zones. Because of the prior art storage and encoding burden for current implementations, the benefits of user specific advertising that would be expected for internet based technologies are not realized.

Figure 1:
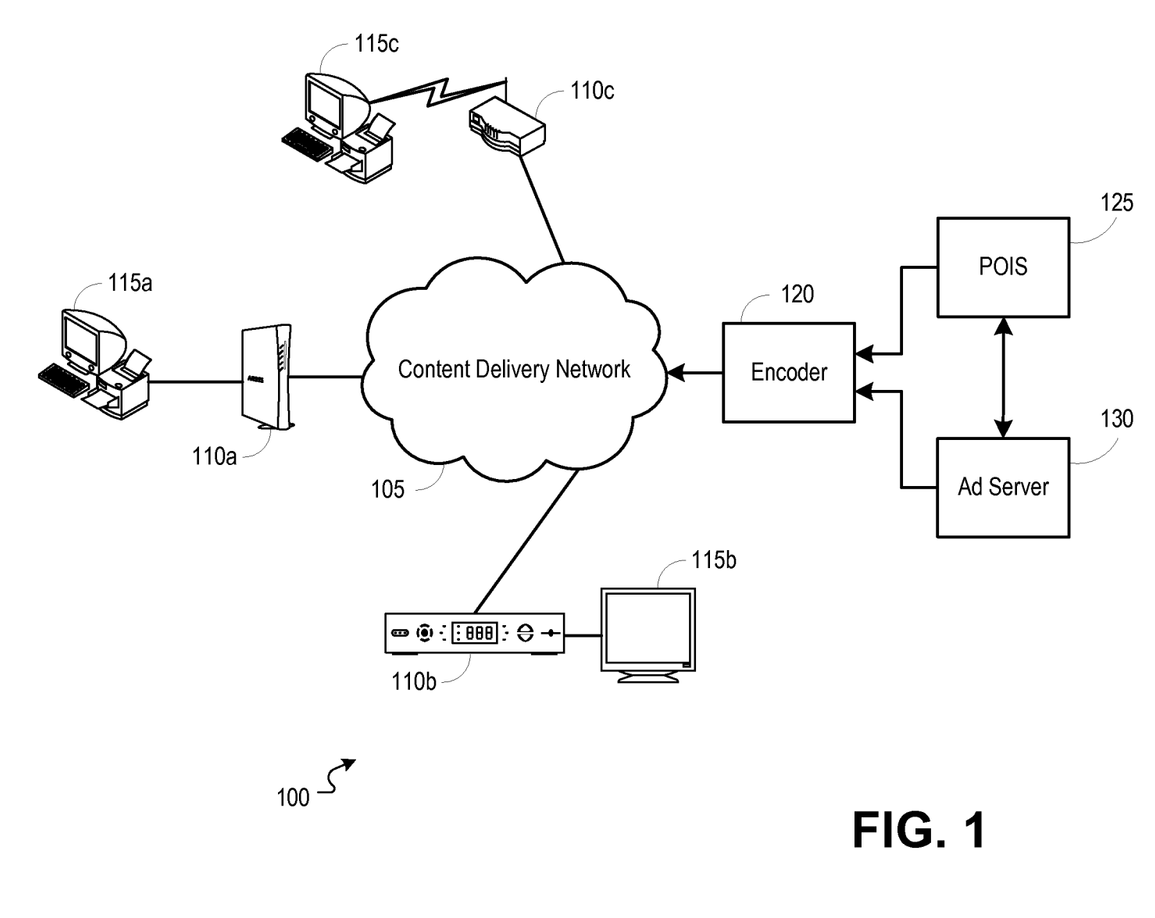
FIG. 1 is a block diagram illustrating an example network environment operable to provide for structuring of dynamic advertisement breaks in video manifest files.

FIG. 1 is a block diagram illustrating an example network environment 100 operable to provide a network environment for structuring of dynamic advertisement breaks in video manifest files. In some implementations, a content delivery network 105 (CDN) can provide video and/or data service(s) to customer premise equipment (CPE) devices 110a-c in one or more subscriber groups (e.g., service group(s)). The CPE devices can include, for example, a cable modem 110a, a set top box 110b, or a wireless router including an embedded cable modem 110c, among many others (e.g., digital subscriber line (DSL) modem, whole home gateway/digital video recorder device, communications device, etc.). A cable modem or embedded multimedia terminal adapter (eMTA) 110a can facilitate communications between a CDN 105 and a computer 115a. A set top box 110b can facilitate communications between a CDN 105 and a television or a separate digital video recorder (DVR). A wireless router 110c can facilitate wireless communications between a computer 115c and a CDN 105. The CDN 105 can include, for example, a hybrid fiber-coax (HFC) network (not shown), or other type of network (e.g., digital subscriber line (DSL), IEEE 802.11, cellular, etc.).

In some implementations, an encoder 120 can be operable to recognize advertisement breaks in a video stream. In some implementations, the encoder 120 can recognize advertisement break cues embedded in the video stream (e.g., using SCTE 35 standard based cue tracks). In other implementations, the location of the advertisement break in the video stream may be signaled out-of-band using other triggering mechanisms. When an advertisement break is recognized, the encoder 120 can communicate with a placement opportunity information service 125 (POIS) and/or an advertisement server 130. In some implementations, the encoder 120 can collect metadata or other information (e.g., duration, ownership, format, etc.) about an advertisement from the POIS 125 and/or advertisement server 130 and can use the information to structure an advertisement breaks in a video manifest file.

Figure 2:
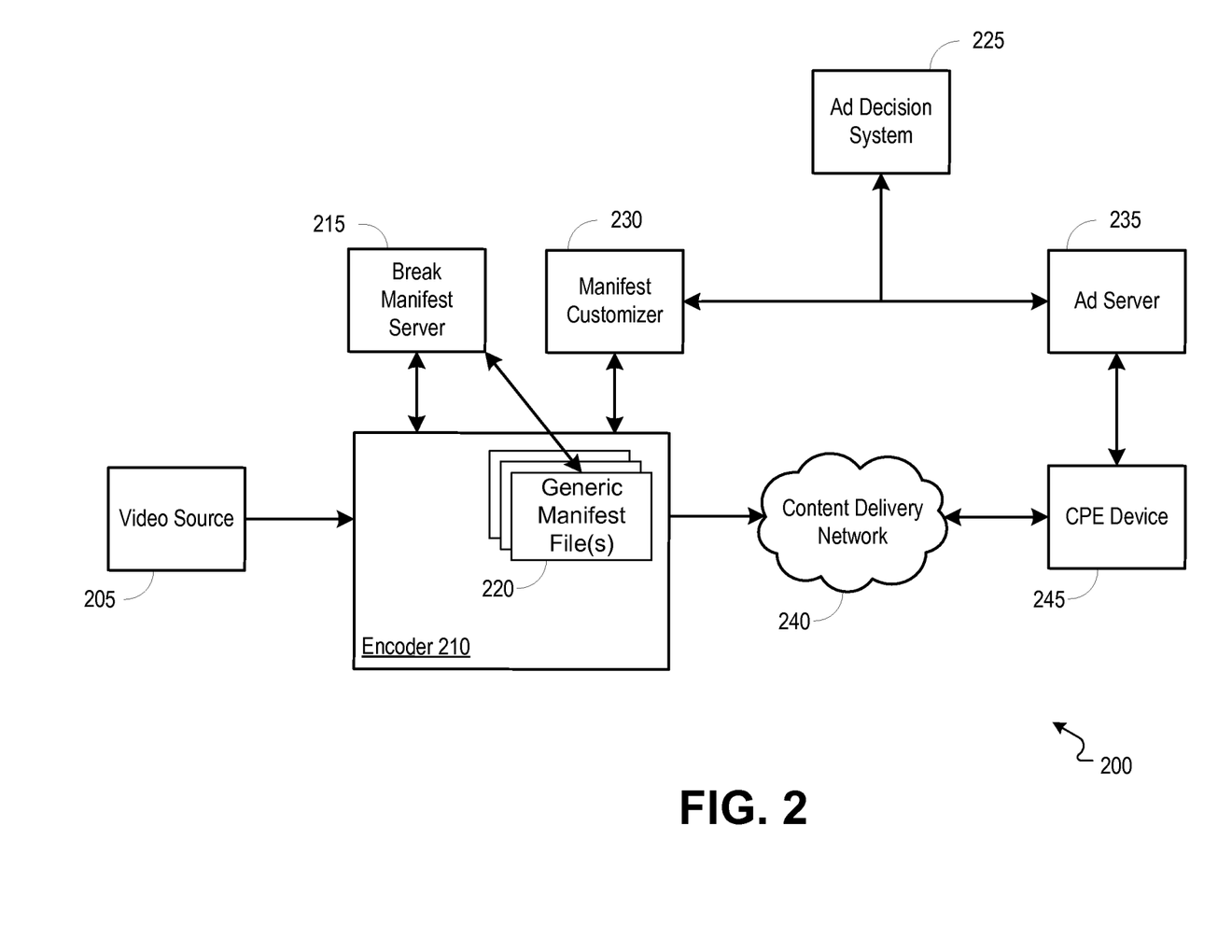
FIG. 2 is a block diagram illustrating an example network operable to facilitate structuring of dynamic advertisement breaks in video manifest files.

FIG. 2 is a block diagram illustrating an example network 200 operable to facilitate structuring of dynamic advertisement breaks in video manifest files. In some implementations, a video stream can be received from a video source 205 by an encoder 210. The video source, for example, can be a content provider broadcasting or multicasting video content over a network to a service operator. In some implementations, the video stream can be received by the encoder 210 in a variety of formats (e.g., Windows Media, RealMedia, Quicktime, MPEG-4, Adobe Flash, etc.).

In some implementations, the encoder 210 can communicate with a break manifest server (BMS) 215 to provide manifest information for an advertising break. For example, the encoder 210 can request metadata for an advertising break in the video stream from the BMS 215. As another example, the BMS 215 can respond to the encoder 210 with specific lines to place in a generic manifest file. In still other examples, the response from the BMS 215 can provide an exact entry of the BMS payload into the generic manifest file or variations thereof. In some implementations, the communication between the encoder 210 and the BMS 215 can be used for adaptive bitrate video through managing multiple manifest files in a coordinated fashion. As an example, a single break manifest request/response pair can be used for multiple bitrates by the encoder 210. In some implementations, precise timing between the encoder 210 and the BMS 215 can be coordinated using time-syncing methods (e.g. using network time protocol (NTP)).

In some implementations, the encoder 210 can receive references for advertisement segments to be included in a video stream for insertion into the generic manifest file 220. For example, the encoder 210 can receive references for advertisement segments from the encoder 210 or the BMS 215 for insertion into the generic manifest file 220. In other implementations, the generic manifest file 220 may be updated to include generic advertisements that can play as defaults or backups in the event that specific targeted advertisements for specific clients are not received by the encoder 210.

In some implementations, when the encoder 210 receives a reference for an advertisement segment to be included in the generic manifest file 220, an advertisement segment can be retrieved from an advertisement decision system 225. For example, the advertisement decision system 225 can be operable to target advertisements to individual CPE devices and can be accessed by a manifest customizer 230 or an advertisement server 235. In some implementations, advertisements can be targeted to individual CPE devices through manifest customization, wherein the manifest customizer 230 can modify the generic manifest file 220 for each individual CPE device. In other implementations, advertisements can be targeted to individual CPE devices through segment targeting, wherein the advertisement server 235 can interpret the generic manifest file 220 differently for different CPE devices. The advertisement decision system 225 can be accessed using an Society of Cable and Telecommunications Engineers (SCTE) 130 standard or other proprietary methods.

In some implementations, advertisement segments referenced in the generic manifest file 220 can be delivered through a content delivery network 240 and to a CPE device 245. In other implementations, advertisement segments referenced in the generic manifest file 220 can be delivered to the CPE device 245 from the advertisement server 235.

Figure 3:
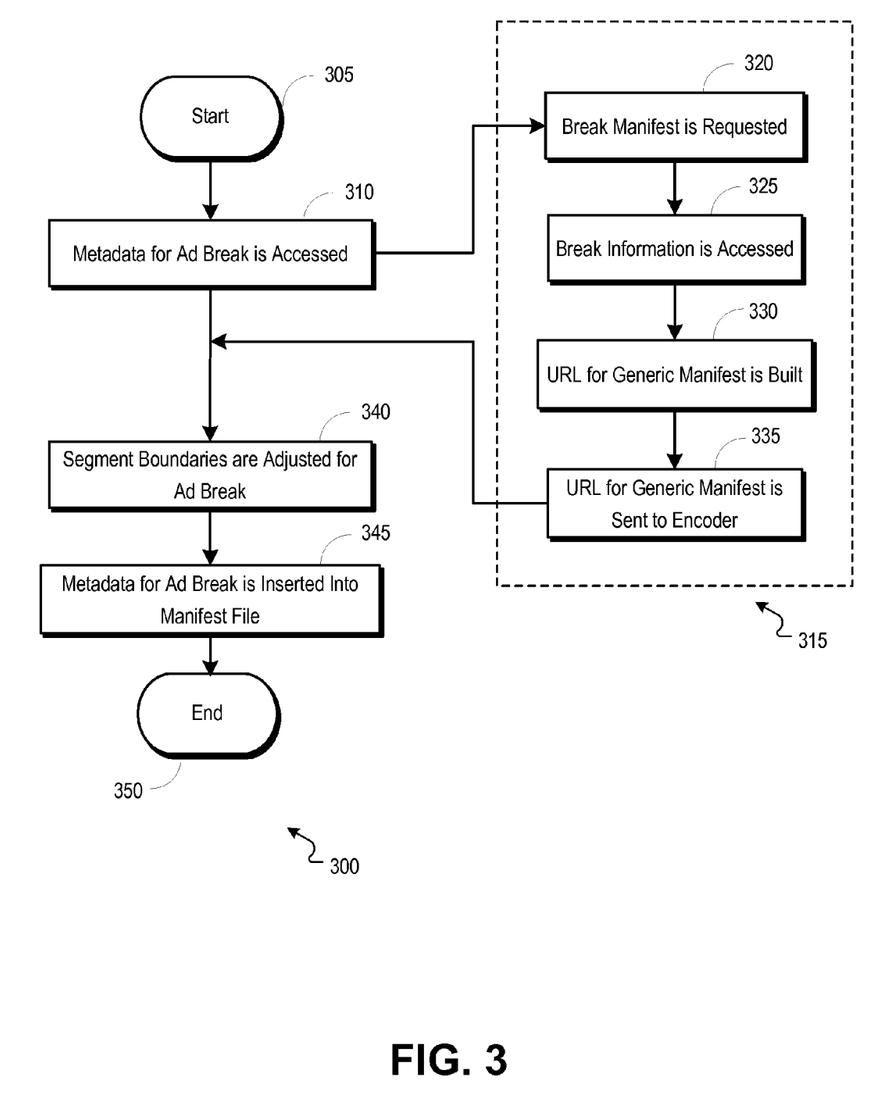
FIG. 3 is a flowchart illustrating an example process operable to facilitate structuring of dynamic advertisement breaks in video manifest files.

FIG. 3 is a flowchart illustrating an example process 300 operable to facilitate structuring of dynamic advertisement breaks in video manifest files. The process 300 can start at stage 305 when a break is identified. The break can be identified, for example, by an encoder (e.g., encoder 210 of FIG. 2). In some implementations, an encoder 210 of FIG. 2 can recognize advertisement break cues embedded in a video stream (e.g., using SCTE 35 standard based cue tracks). In other implementations, the location of the advertisement break in a video stream may be signaled out-of-band using other triggering mechanisms.

After a break is identified, the process 300 can proceed to stage 310. At stage 310, metadata for the advertisement break (e.g., duration, ownership, format, etc.) can be accessed. Metadata for the advertisement break can be accessed, for example, by an encoder (e.g., encoder 210 of FIG. 2) from a break manifest server (e.g., BMS 215 of FIG. 2). In some implementations, a BMS can respond to an encoder with specific lines of code or script to place in a generic manifest file. In other implementations, the BMS response can provide an exact insertion point for a BMS payload into the generic manifest file or other server or feed, or can insert the specific lines of code into the generic manifest file. In some implementations, metadata for the advertisement break can be accessed through the sub-process 315.

The sub-process 315 can be operable to facilitate retrieval of metadata for an advertisement break. The sub-process 315 can start at stage 320 when an advertisement break manifest is requested. An advertisement break manifest can be requested, for example, by an encoder (e.g., encoder 210 of FIG. 2) from a manifest server (e.g., BMS 215 of FIG. 2). In some implementations, communication between an encoder and a BMS can be initiated by the encoder when an advertisement break is recognized in a video stream. For example, the advertisement break can be identified based on the time of the break (e.g., the coordinated universal time (UTC) of the break). In this example, a linear advertisement system can consult a daily schedule and, based on the time from the schedule, can select the appropriate advertisement to play. As another example, the advertisement break can be identified by recognizing a break reference embedded in an SCTE 35 cue message. In other examples, the advertisement break can be identified through other methods (e.g., proprietary and/or standards-based methods).

After the advertisement break manifest is requested, the sub-process 315 can proceed to stage 325. At stage 325, advertisement break information can be accessed. Advertisement break information can be accessed, for example, by a manifest server (e.g., BMS 215 of FIG. 2). In some implementations, the BMS can access the break duration and the location of the advertisement server to be used at run time to play the advertisement. In this implementation, the BMS can access duration and other break metadata through a variety of methods. For example, the BMS can access daily advertisement break schedules or can communicate with an SCTE 130 placement opportunity information service (POIS). As another example, information can be accessed and included in a generic manifest uniform resource locator (URL) as hypertext transfer protocol (HTTP) arguments.

After break information is accessed, the sub-process 315 can proceed to stage 330. At stage 330, a URL for the advertisement content can be built for insertion into a generic manifest. The URL for the advertisement content can be built, for example, by a manifest server (e.g., BMS 215 of FIG. 2).

After the URL for the advertisement content is built, the process 315 can proceed to stage 335. At stage 335, the URL for the advertisement content can be sent to an encoder. The URL can be sent to an encoder (e.g., encoder 210 of FIG. 2), for example, by a manifest server (e.g., BMS 215 of FIG. 2). After the URL for the advertisement content is sent to the encoder 210 of FIG. 2, the sub-process 315 can end and the process 300 can continue at stage 340.

Returning to the process 300, after metadata for the advertisement break is accessed, the process 300 can proceed to stage 340. At stage 340, video segment boundaries can be adjusted for the advertisement break. Segment boundaries can be adjusted, for example, by an encoder (e.g., encoder 210 of FIG. 2). In some implementations, segment boundaries can be adjusted so that the beginning and ending of an advertisement break falls directly on segment boundaries.

After segment boundaries are adjusted, the process 300 can proceed to stage 345. At stage 345, metadata or the URL for the advertisement break can be inserted into a manifest file. Metadata or the URL for the advertisement break can be inserted into a manifest file (e.g., generic manifest file 220 of FIG. 2), for example, by an encoder or manifest server (e.g., encoder 210 of FIG. 2 or BMS 215 of FIG. 2). In some implementations, the encoder can insert break manifest lines directly into a generic manifest file. As an example of this implementation, the break manifest lines can include a reference to a generic advertisement which can imply that an embedded advertisement in the video stream can be effectively dropped. In another implementation, an encoder can insert encoded advertisement segments into a generic manifest file as default, generic or backup advertisements. In other implementations, other methods of inserting break manifest lines into a manifest file can be used. In some implementations, the method of inserting break manifest lines into a manifest file can be determined in a variety of ways. For example, a special identifier can be used as the advertisement name returned by the BMS. In some implementations, the inserted metadata for the advertisement break can be operable to facilitate coordination of downstream insertion of the advertisement break by downstream devices within the network. For example, the inserted metadata can drive downstream decisions by a manifest customizer or an advertisement server. After metadata for the advertisement is inserted into the manifest file, the process 300 can proceed to stage 350 where the process 300 ends.

Figure 4A:
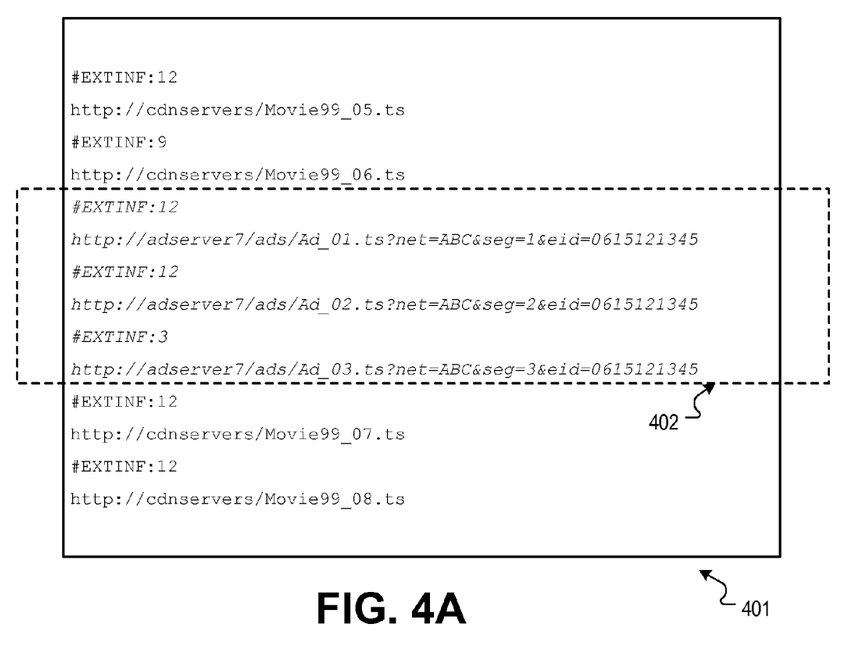
FIG. 4A is an example illustration of a generic manifest comprising advertisement segment lines inserted directly from a manifest server.

FIG. 4A is an example illustration of a generic manifest 401 comprising advertisement segment lines 402 inserted directly from a manifest server. In some implementations, the segment lines 402 can be inserted into a generic manifest (e.g., generic manifest file 220 of FIG. 2) directly from a manifest server (e.g., BMS 215 of FIG. 2). In some implementations, the advertisement segment lines 402 can be structured based on metadata associated with the advertisement. As an example, a BMS can divide an advertisement into a number of segments based on the duration of the advertisement. As another example, a BMS can include in each advertisement segment line the advertisement server location (e.g., "adserver7") and/or additional information as HTTP arguments (e.g., "net=ABC").

Figure 4B:
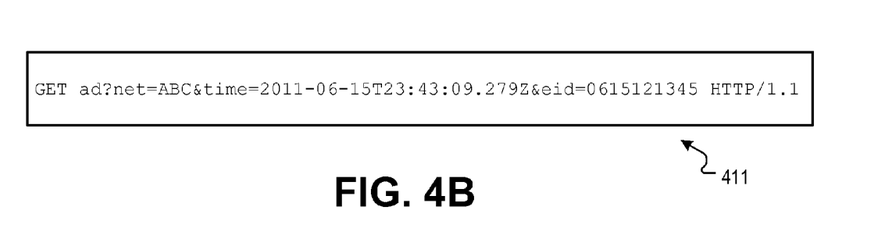
FIG. 4B is an example illustration of an advertisement break manifest request using basic HTTP messaging.

FIG. 4B is an example illustration of an advertisement break manifest request 411 using basic HTTP messaging. In some implementations, the break manifest request 411 can be sent from an encoder to a BMS. In other implementations, the manifest request 411 can include identification information of an advertisement break. For example, the break manifest request can communicate to a BMS the UTC of the break and/or the event identification of the break. In some implementations, the information exchange between the encoder and the BMS can be accomplished using HTTP POST messages to send extensible markup language (XML) documents for the break manifest request. In other implementations, other transport and message structures can be used (e.g., XML). In some implementations, the advertisement break manifest request 411 can be used with various media streaming communications protocols (e.g., HTTP live streaming (HLS), Microsoft Smooth Streaming (MSS), Adobe Flash (AFL), etc.).

Figure 4C:
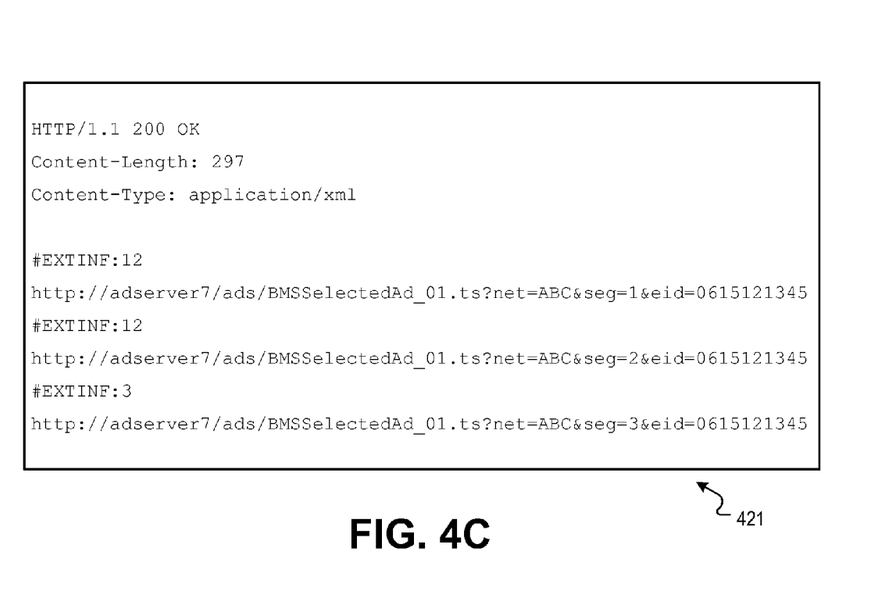
FIG. 4C is an example illustration of an advertisement break manifest response using basic HTTP messaging.

FIG. 4C is an example illustration of an advertisement break manifest response 421 using basic HTTP messaging. In some implementations, the break manifest response 421 can be sent from a BMS in response to a request from an encoder. In other implementations, a BMS can structure the break manifest response 421 based on metadata of the advertisement. In some implementations, the information exchange between the encoder and the BMS can be accomplished using HTTP POST messages to send XML documents for the break manifest response. For example, the break manifest text can be returned as character data (CDATA) embedded in the XML response document. In other implementations, other transport and message structures can be used (e.g., XML). In some implementations, the advertisement break manifest response 421 can be used with various media streaming communications protocols (e.g., HTTP live streaming (HLS), Microsoft Smooth Streaming (MSS), Adobe Flash (AFL), etc.).

Figure 4D:
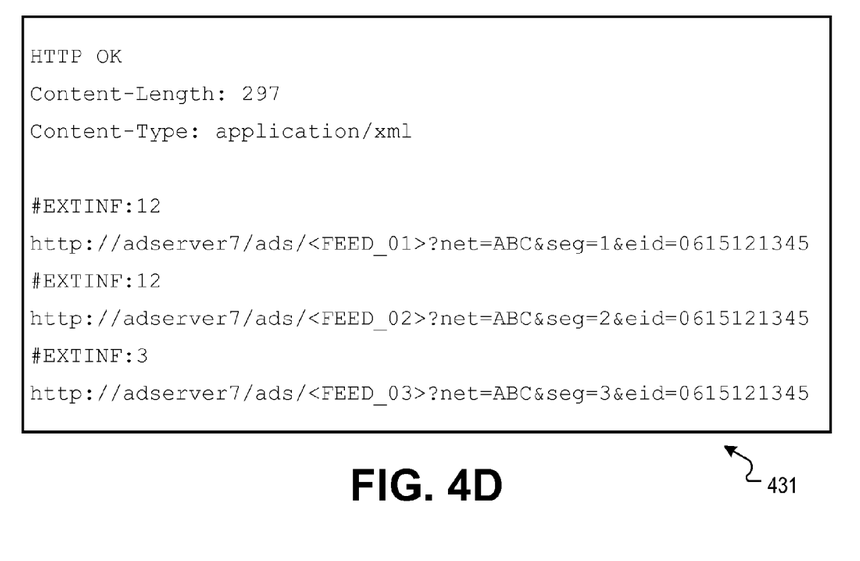
FIG. 4D is an example illustration of an advertisement break manifest response instructing an encoder to use an underlying feed as a generic advertisement.

FIG. 4D is an example illustration of an advertisement break manifest response 431 instructing an encoder to use an underlying feed as a generic advertisement. In some implementations, a BMS can include identification information of a feed that can be used by an encoder as a generic advertisement segment. For example, a BMS can include in the break manifest response 431 a string (e.g., "<FEED>") that can signal to an encoder that an underlying feed should be packaged into a generic manifest file. In other implementations, other transport and message structures can be used (e.g., XML). In some implementations, the advertisement break manifest response 431 can be used with various media streaming communications protocols (e.g., HTTP live streaming (HLS), Microsoft Smooth Streaming (MSS), Adobe Flash (AFL), etc.).

Figure 4E:
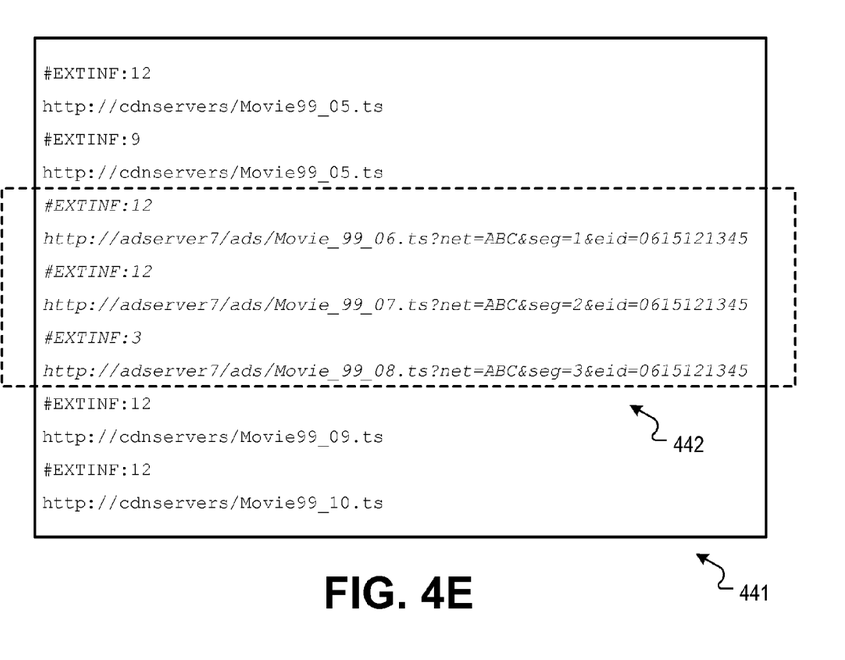
FIG. 4E is an example illustration of a generic manifest comprising generic advertisement segments from a video feed.

FIG. 4E is an example illustration of a generic manifest 441 comprising generic advertisement segments 442 from a video feed. In some implementations, an encoder can place generic advertisement segments 442 from an underlying feed into a generic manifest file 441. For example, the generic advertisement segments 442 can include identification information and/or other information about the underlying feed.

Figure 5:
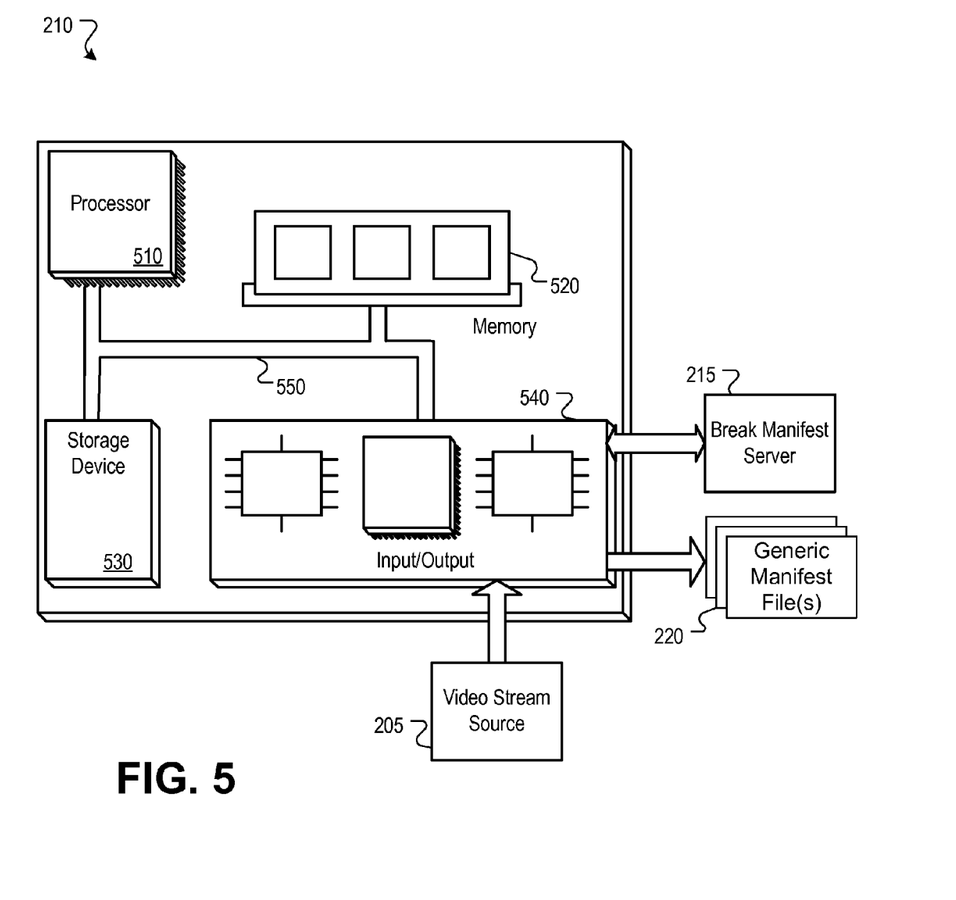
FIG. 5 is a block diagram of a hardware configuration for an encoder operable to facilitate structuring of dynamic advertisement breaks in video manifest files.

FIG. 5 is a block diagram of a hardware configuration for an encoder 500 operable to facilitate structuring of dynamic advertisement breaks in video manifest files. While an encoder is shown in this example, it should be understood that many different kinds of devices can implement a method to facilitate structuring dynamic advertisement breaks in video manifest files. The encoder 500 can include a processor 510, a memory 520, a storage device 530, and an input/output device 540. Each of the components 510, 520, 530, and 540 can, for example, be interconnected using a system bus 550. The processor 510 is capable of processing instructions for execution within the encoder 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the encoder 500. In one implementation, the storage device 530 can be a computer-readable medium. In various different implementations, the storage device 530 can, for example, include a hard disk device, an optical disk device, flash memory or some other large capacity storage device.

The input/output device 540 can provide input/output operations for the hardware configuration 500. In one implementation, the input/output device 540 can include one or more of a network interface device (e.g., an Ethernet card), a serial communication device (e.g., an RS-232 port), and/or a wireless interface device (e.g., an 802.11 card). In some implementations, the input/output device can include driver devices configured to receive input data (e.g., a video feed) from a video stream source 205. In another implementation, the input/output device can include driver devices configured to receive input data and send output data to a BMS 215. For example, the encoder 500 can request a break manifest from the BMS 215, and the BMS 215 can send the break manifest to the encoder 500. In yet another implementation, the input/output device can include driver devices configured to send output data to a generic manifest file 220. For example, the encoder 500 can place structured advertisement breaks into the generic manifest file 220.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
    identifying an advertisement break within a broadcast multimedia stream received at a headend encoder;
    accessing metadata at a manifest customizing server included within the broadcast multimedia stream, the metadata being associated with the advertisement break;
    generating one or more segment line structures at the manifest customizing server based on the metadata associated with the advertisement break, wherein the one or more segment line structures comprise information identifying a location of specific advertisement content, the specific advertisement content correlating with one or more specific subscriber devices; and
    inserting the one or more segment line structures generated by the manifest customizing server into an original manifest file to create a customized manifest file at the headend encoder device, the original manifest file being a generic manifest generated independently of the one or more segment line structures, the generic manifest being broadcast to multiple remotely located encoders and including reference to one or more generic advertisements included in the advertisement break, wherein one or more of the generic advertisement references are replaced by the information identifying a location of specific advertisement content.

2. The computer-implemented method of claim 1, wherein the multimedia stream is a video stream using segmented hypertext transfer protocol transport.

3. The computer-implemented method of claim 1, further comprising:
    targeting advertisements to individual subscriber devices using the manifest customizing server.

4. The computer-implemented method of claim 3, wherein targeting comprises customizing advertisement entries in a manifest file for each of the subscriber devices using the manifest customizing server.

5. The computer-implemented method of claim 3, wherein targeting comprises interpreting the customized manifest file generated by the manifest customizing server separately for each of the subscriber devices through an advertisement server.

6. The computer-implemented method of claim 1, wherein the one or more segment line structures comprise a location of an advertisement server for one or more advertisement segments to include in the customized manifest file including the one or more segment line files generated by the manifest customizing server.

7. The computer-implemented method of claim 1, wherein the original manifest file comprises identification of one or more default advertisements via default segment line structures.

8. A manifest customizing system, comprising:
    a data store operable to store computer program instructions and provide temporary storage for the system;
    a processor operable to execute said computer program instructions, the computer program instructions being operable to cause the processor to identify an advertisement break within an original manifest associated with a multimedia stream, and independently from the generation of the original manifest the processor is operable to generate one or more segment line structures identifying advertisements for inclusion in the multimedia stream based on the information associated with the advertisement break, the advertisements being identified by an advertisement decision system and being supplied by a remotely located advertisement server separate from content associated with the multimedia stream, wherein the one or more segment line structures comprise information identifying a location of specific advertisement content, the specific advertisement content correlating with one or more specific subscriber devices; and
    an interface operable to be used to:
    access information associated with the advertisement break; and
    instruct an encoder to insert the one or more segment line structures into a modified manifest file, the modified manifest file comprising a generic manifest file including references to one or more generic advertisements, wherein one or more of the generic advertisement references are replaced by the information identifying a location of specific advertisement content.

9. The system of claim 8, wherein the multimedia stream comprises a video stream using segmented hypertext transfer protocol transport.

10. The system of claim 8, wherein said segment line structures are further operable to be used to:
 target advertisements to individual subscriber devices.

11. The system of claim 10, wherein targeting comprises customizing advertisement entries in a manifest file for each of the subscriber devices as identified by the advertisement decision system.

12. The system of claim 10, wherein targeting comprises interpreting the modified manifest file separately for each of the subscriber devices through an advertisement server.

13. The system of claim 8, wherein the one or more segment line structures comprise a location of an advertisement server for one or more advertisement segments to include in the multimedia stream.

14. The system of claim 8, wherein an original manifest file comprises identification of one or more default advertisements via default segment line structures.

15. One or more non-transitory computer readable media operable to execute on a processor, the computer readable being operable to cause the processor to perform the operations comprising:
 identifying an advertisement break within a multimedia stream based on a generic manifest file included with the multimedia stream, wherein the generic manifest file comprises references to one or more generic advertisements;
 accessing metadata included within the multimedia stream, the metadata being associated with the advertisement break and identified by the generic manifest file;
 generating one or more segment line structures at a manifest customizing system based on the metadata associated with the advertisement break, the one or more segment line structures being generated independently of the original manifest file, the one or more segment line structures being operable to link targeted advertisements identified by an ad decision system and being independently provided to a customer premise equipment device from a remote advertisement server; and
 inserting the one or more segment line structures into the generic manifest file at a headend encoder to create a customized manifest file, wherein one or more of the generic advertisement references are replaced by identified targeted advertisements.

16. The one or more computer-readable media of claim 15, wherein the multimedia stream comprises a video stream using segmented hypertext transfer protocol transport.

17. The one or more computer-readable media of claim 15, further operable to cause the processor to perform operations comprising:
 requesting from the ad decision system advertisements targeted to individual subscriber devices.

18. The computer-implemented method of claim 17, wherein the advertisements targeted to individual subscriber devices comprise customized advertisement entries inserted into the customized manifest file for each of the subscriber devices.

19. The one or more computer-readable media of claim 17, wherein targeting comprises interpreting the customized manifest file separately for each of the subscriber devices through an advertisement server.

20. The one or more computer-readable media of claim 15, wherein the one or more segment line structures comprise a location of the remote advertisement server for one or more advertisement segments to include in the customized manifest file.

21. The one or more computer-readable media of claim 15, wherein the generic manifest file identifies one or more default advertisements and the customized manifest file identifies one or more targeted advertisements.

\* \* \* \* \*